Nov. 29, 1960 A. F. O'HARAH 2,961,985
SOLDERING MACHINE
Filed May 2, 1958 2 Sheets-Sheet 2

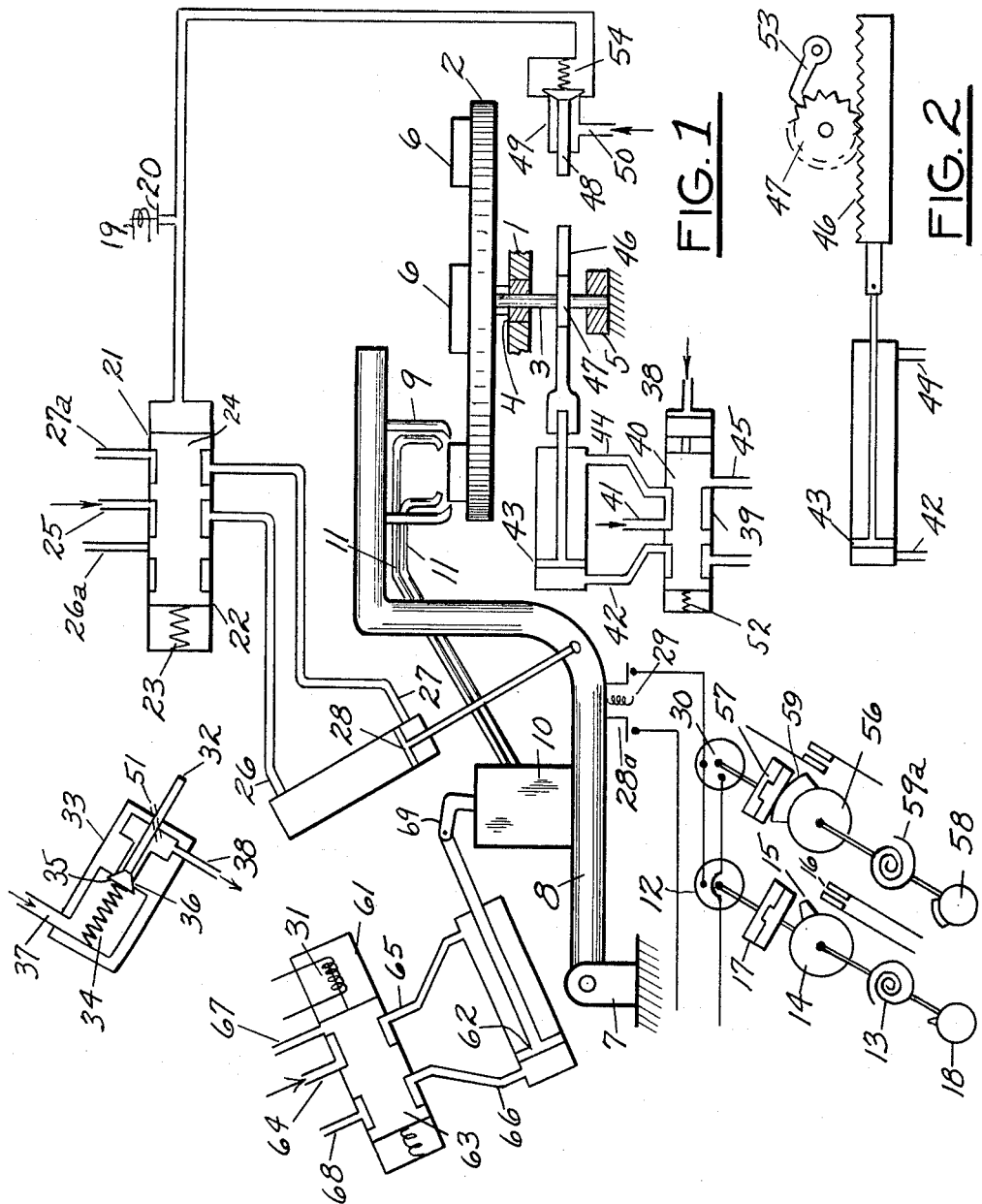

INVENTOR.
Alvin F. O'Harah
BY Ralph Hammar
attorney

United States Patent Office 2,961,985
Patented Nov. 29, 1960

2,961,985

SOLDERING MACHINE

Alvin F. O'Harah, Erie, Pa., assignor to Castle Machines, Incorporated, Erie, Pa., a corporation of Pennsylvania Filed May 2, 1958, Ser. No. 732,554

5 Claims. (Cl. 113—128)

This invention is an automatic soldering or brazing machine which is readily adaptable to a wide variety of soldering operations. In a preferred form, as the article to be soldered reaches the soldering position, an arm carrying torches and solder feeding tubes moves down into position with the torches surrounding the joint to be soldered and directing the heat where it is needed. Usually there are several torches and each of the torches has an adjustable tip so that on the job adjustments may be made of the heat distribution. The heating time of the torches is controlled by a timer which is started in operation by the lowering of the arm. Another timer, separately adjustable, controls the solder feed which starts an adjustable interval after the torches are in heating position so that the joints are heated to the proper temperature when the solder arrives. At the end of the solder feed, the arm raises, the timers reset, and the soldered article moves away by an indexing mechanism which is set in motion by the arrival of the arm at its raised position. The lowering of the arm is under the control of the index mechanism and cannot start until the work carrier arrives at its next index position.

The work carrier will be loaded with a succession of articles to be soldered and the arm may carry several sets of torches so that the articles ahead of the one being soldered may be preheated prior to arrival at the soldering station. Because the arm is lifted out of the way before the work moves on, the torches can be placed where needed for heating without regard to the path of movement of the work. The ability to adjust the solder feeding to start a preselected time after the lowering of the torches is an important advantage in making soldered joints because the solder feed can be set to arrive at the instant the joint is heated to the temperature best for soldering.

Figure 4:
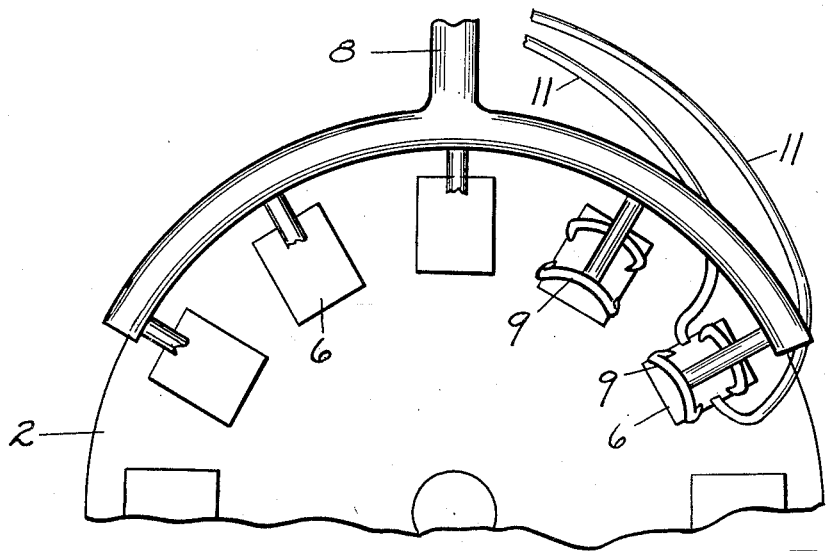
Figure 5:
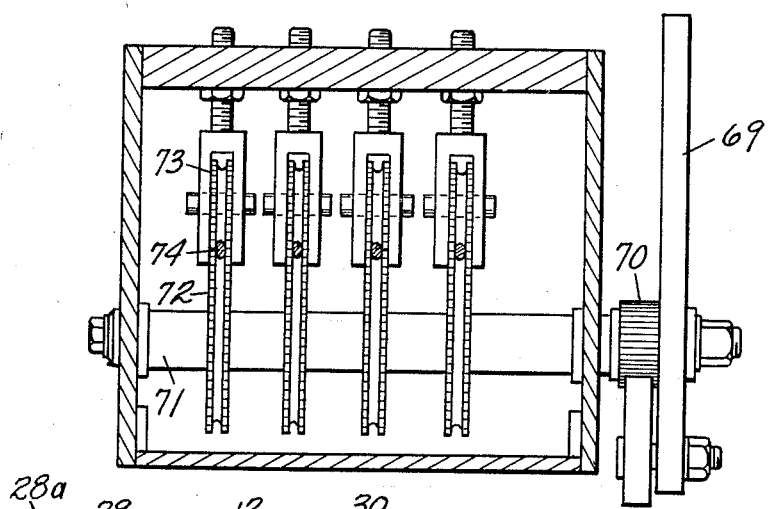
Figure 3:
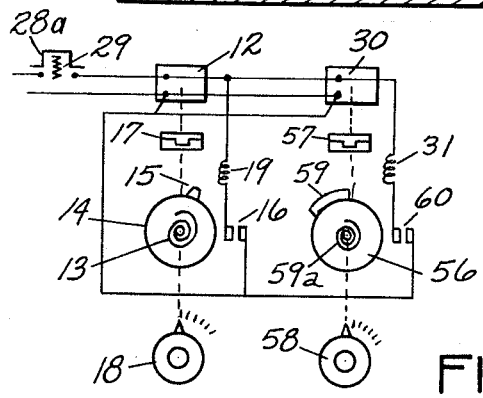

In the accompanying drawing, Fig. 1 is a diagrammatic side elevation of a soldering machine; Fig. 2 is a fragmentary view of the index mechanism; Fig. 3 is a circuit diagram; Fig. 4 is a top plan view showing the torch carrying arm in relation to the work carrying turntable; and Fig. 5 is a detail of the solder feed.

The soldering machine has a frame 1 having at its center a work carrier 2 in the form of a turntable mounted on a shaft 3 journaled in bearings 4 and 5. Around the periphery of the turntable are a plurality of angularly spaced work supports or jigs 6 for receiving the articles to be soldered. The shape of the work supports naturally will vary with the articles to be soldered. The soldering operation (including preheating) takes place at only a few of the work supports and the remaining work supports are loading and unloading stations.

At one side of the frame is a bracket 7 on which is pivoted an arm 8 carrying a plurality of sets of torches 9 with each set in the lowered position of the arm registering with one of the work supports 6. The torches have adjustable tips so that the flame can be directed in any direction so as to apply the heat in the position most advantageous for soldering the joint. Also mounted on the arm is a solder feeding device 10 having solder feeding tubes 11 which are bent to discharge solder wire directly on the joint to be soldered. If the joint is a large one, there may be several of the solder feeding tubes each placed to provide the solder for a different part of the joint. The soldering operation takes place at the last of the sets of torches 9. The sets of torches 9 ahead of the last set are preheating torches which bring the joint up nearly to soldering temperature. The reason for this is that the actual soldering of the joint may take place in quite a short time while a much longer time will be required to bring the metal up to soldering temperature. By having several preheating stations, each of which acts successively on the joint for a short interval, the longer preheating time is compensated for and the successive indexing of the turntable is at intervals more nearly equal to that required for actual soldering of the joint.

The indexing of the turntable is started by a resetting timer 12 which whenever the timer is de-energized is returned to the starting position by a spring 13. Such timers are standard commercial products. When the timer is energized, it drives a cam 14 having a projection 15 cooperating with switch contacts 16. The cam 14 is driven by a slip clutch 17 so that it can be set for any desired time interval by means of a knob 18. At the end of the set interval, the projection 15 closes the switch contacts 16 which are in series with a solenoid 19 controlling a bleed valve 20. The valve 20 is normally closed. When the solenoid 19 is energized, the bleed valve is opened and bleeds air from the right end of cylinder 21 of a four way pilot valve 22. The bleeding of air from the right end of the cylinder 21 permits the coil spring 23 to move the piston 24 to the right to switch the connection of compressed air line 25 from port 26 to port 27 on a double acting piston 28 connected to the arm 8. When compressed air is supplied to the port 26 (as illustrated), the arm is moved to and held in the lowered position. When compressed air is connected to the port 27, the arm 8 is raised to the upper position. The ports in the piston 24 are such that when compressed air is being supplied to one of the ports 26, 27, the other port acts as an exhaust port. The venting or exhaust from port 27 is through port 27a while the venting or exhaust for port 26 is through port 26a. As soon as the arm 8 starts upward, switch 28a is opened by its biasing spring 29 thereby opening the circuit to the timer 12 and solenoid 19 and also to the timer 30, and solenoid 31. Upon opening the circuit to the timer 12, it is reset by the spring 13 to the starting position thereby opening switch contacts 16. Deenergizing the solenoid 19 closes the valve 20 and places it in readiness for the next operation.

When the arm 8 reaches its uppermost position, it engages the operating plunger 32 of a three way pilot valve 33. The pilot valve is normally biased by a spring 34 to the position illustrated in Fig. 1 where a valve member 35 is held against a valve seat 36 shutting off the compressed air supply line 37. Upon engagement of the plunger 32 by the arm 8, the valve member 35 is moved away from the seat 36 allowing the flow of air through line 38 to a four way pilot valve 39. The compressed air acts on a valve piston 40 moving it to the left from the position shown in Fig. 1 to a position in which compressed air supply line 41 is connected to a line 42 leading to one end of a double acting piston 43. In this position, line 44 at the other end of the piston 43 is connected to exhaust passageway 45. The supply of air to the line 42 causes the piston 43 to move to the right as viewed in Figs. 1 and 2 thereby turning the turntable 2 through a rack and pinion drive 46, 47. The extent of the angular movement of the turntable depends upon the stroke of the piston 43 and the diameter of the pinion 47 engaged by the rack 46. The angular movement can be quickly adjusted by changing pinions 47. At the end of the travel of the piston 43 the rack 46 strikes the plunger 48 of a normally closed valve 49 connected between a compressed air supply line 50 and the solenoid valve 20 leading to the pilot valve 21. This means that the valve 49 is opened when the table reaches its new index position and compressed air is supplied to the four way valve 21 causing it to move to the left to the position illustrated in Fig. 1. Leftward movement of the piston 24 of the four way valve 21 connects the compressed air supply line 25 to the line 26 at the upper end of the double acting piston 28 and causes the arm 8 to be moved downward. It should be noted that this downward movement cannot take place until the turntable 2 has reached its new index position. As soon as the arm 8 moves away from its uppermost position, the valve plunger 32 of the three way valve 33 is returned by spring 34 to the position illustrated in Fig. 1 where the supply of compressed air from line 37 is cut off by the closing of valve member 35 against seat 36 and the compressed air in line 38 is vented to the atmosphere through way 51. The venting of line 38 allows the spring 52 to move the valve plunger 40 to the right to the position illustrated in Fig. 1 thereby connecting the compressed air supply line 41 of the double acting piston 43 to the line 44 and causing the piston to return to the position illustrated. While the rack 46 returns as the piston 43 moves to the left, a pawl 53 prevents backward movement of the pinion 47 and the teeth of the racks slide over the teeth of the pinion so that the turntable 2 remains in the indexed position. The return movement of the rack 46 allows valve member 48 to be closed by spring 54 thereby shutting off the supply of compressed air to the four way valve 21 from line 50. Valve 21, however, remains in the position illustrated because of the air trapped between it and the valve 49.

From the foregoing it will be noted that the arm 8 and turntable 2 move in a controlled sequence. The indexing of the turntable 2 cannot start until the arm 8 reaches its uppermost position and actuates the valve piston 32. The lowering of the arm 8 cannot start until the table 2 reaches its new index position and the rack 46 actuates the valve member 48. As soon as the downward movement of the arm 8 starts, the four way valve 39 controlling the double acting indexing piston 43 is reset to the position illustrated in Fig. 1 by the bleeding of the compressed air in line 38 through vent 51. When the down time for the arm 8 runs out as determined by the closing of contacts 16 by the timer 12, the piston 43 is accordingly ready to index the table to the next position.

The feed of solder is under the control of the resetting timer 30. This timer has a cam 56 driven through a slip clutch 57 and settable with respect to the zero position of the timer by a knob 58. When the timer 30 is deenergized, it returns or is automatically reset by spring 59a to the zero position in which the projection 59 on the cam 56 may have a different angular position than the projection 15 on the cam 14. After a time interval determined by the setting of the cam 56, the projection 59 closes contacts 60 in series with solenoid 31 in a four way solenoid valve 61 controlling a double acting piston 62 mounted on arm 8. In the de-energized position of the solenoid 31 the valve plunger 63 occupies the position illustrated in Fig. 1 where the compressed air supply line 64 is connected to the line 65 at the forward end of the piston 62 thereby holding the piston in the retracted position illustrated. Upon energizing of the solenoid 31, the valve plunger 63 is moved downward to a position in which the compressed air line is connected to line 66 at the lower end of the piston exerting a force moving the piston 62 upward. At the same time that compressed air is supplied to line 66, line 65 is vented to the atmosphere through way 67 and vent way 68 is closed. The piston 62 is connected to ratchet 69 driving a ratchet gear 70 keyed to shaft 71. Also keyed on shaft 71 are feed gears 72 which cooperate with other feed gears 73 to feed wire solder 74. The rate of travel of the solder is determined by the speed of movement of the piston 62 which in turn is controlled by the rate at which air is supplied through the supply line 64. Because ordinarily the solder is fed at a relatively slow rate compared to the speed with which the table is indexed or the arm 8 raised and lowered, a throttling restriction will be placed in the air circuit to control the speed of solder feed. The solder feed ordinarily continues until the end of the cycle at which time the projection 15 on cam 14 closes the contacts 16 and causes the raising of the arm 8. At the start of the raising of the arm 8, the switch 28a opens, thereby resetting both timers 12 and 30 and opening both switches 16 and 60. The feeding of the solder starts at a time determined by the adjustment of the knob 58 which may be at any time after the arm 8 reaches its lowered position and is stopped when the arm 8 starts to rise.

The machine is very convenient to set up for any soldering job. Until the torches and heating time are adjusted, the knob 58 is set for a longer time interval than the down time of the arm 8 so that the contacts 60 do not close and no solder is fed. This permits adjustment of the torches 8 and adjustment of the down time of the arm by the knob 18 so as to secure the desired heating of the joint to be soldered. After the proper heating of the joint to be soldered has been adjusted, the knob 58 is then set so that the projection 59 closes the contacts 60 to start the solder feed for the desired proportion of the down time of the arm 8. In some instances, the solder feed starts as soon as the arm reaches its lowered position while in other instances the solder feed is delayed until after the arm has been down for some fraction of its down time interval. These adjustments may be readily and quickly made to set the machine up for different kinds of work and further adjustments may be made during the operation if needed.

What is claimed as new is:

1. In a soldering machine, a support, an arm pivoted thereon, a first piston for moving the arm between raised and lowered positions, a work carrier having a plurality of stations holding work with joints to be soldered, a first pilot valve actuated by arrival of the work carrier at a position in which a joint to be soldered at one station is beneath said arm for activating said piston to lower the arm, torches carried by the arm clear of the work in the raised position of the arm and lowered by the arm to a position directing flame against the joint to be soldered, a first resetting timer started by arrival of the arm at its lowered position for controlling said pilot valve at the end of a time interval to activate said first piston to raise the arm, a solder feeder mounted on the arm having guide tube means for feeding wire solder to the joints heated by the torches, a second piston for moving the solder feeder, a second resetting timer also started by arrival of the arm at its lowered position, a second pilot valve actuated by said second timer at a selected interval after its start for activating the second piston to start the solder feeding, and means actuated by raising of the arm for interrupting the solder feeder and the timers, the timers then resetting to zero.

2. In a soldering machine, a support, an arm pivoted thereon, a piston for moving the arm between raised and lowered positions, a work carrier having a plurality of stations holding work with joints to be soldered, a pilot valve actuated by arrival of the work carrier at a position in which a joint to be soldered at one station is beneath said arm for activating said piston to lower the arm, torches carried by the arm clear of the work in the raised position of the arm and lowered by the arm to a position directing flame against the joint to be soldered, a resetting timer started by arrival of the arm at its lowered position and settable to determine the down time of the arm for controlling said pilot valve to activate said piston to raise the arm at the end of the set down time, a solder feeder mounted on the arm having guide tube means for feeding wire solder to the joints heated by the torches, another resetting timer also started by arrival of the arm at its lowered position and settable to control the start of the solder feeding at a selected interval after the lowering of the arm, a switch opened by raising of the arm for interrupting the solder feeder and the timers, the timers then resetting to zero, indexing means for the work carrier, and means actuated by arrival of the arm at its raised position for actuating the indexing means to move the work carrier to bring the next station into soldering position.

3. In a soldering machine, a support, an arm pivoted thereon, a piston for moving the arm between raised and lowered positions, a work carrier having a plurality of stations holding work with joints to be soldered, a pilot valve actuated by arrival of the work carrier at a position in which a joint to be soldered at one station is beneath said arm for activating said piston to lower the arm, torches carried by the arm clear of the work in the raised position of the arm and lowered by the arm to a position directing flame against the joint to be soldered, a resetting timer started by arrival of the arm at its lowered position and settable to determine the down time of the arm for controlling said pilot valve to activate said piston to raise the arm at the end of the set down time, a solder feeder mounted on the arm having guide tube means for feeding wire solder to the joints heated by the torches, another resetting timer also started by arrival of the arm at its lowered position and settable to control the start of the solder feeding at a selected interval after the lowering of the arm, a switch opened by raising of the arm for interrupting the solder feeder and the timers, the timers then resetting to zero, indexing means for the work carrier, a piston for moving the index means, and a pilot valve controlling the index piston actuated by the arrival of the arm at its raised position for activating the piston to move the index means to bring the next station into soldering position.

4. In a soldering machine, a support, an arm pivoted thereon, mechanism for moving the arm between raised and lowered positions, a work carrier having a plurality of stations holding work with joints to be soldered, means triggered by arrival of the work carrier at a position in which a joint to be soldered at one station is beneath said arm for activating said mechanism to lower the arm, torches carried by the arm clear of the work in the raised position of the arm and lowered by the arm to a position directing flame against the joint to be soldered, a resetting timer started by arrival of the arm at its lowered position settable to determine the down time of the arm and for activating said mechanism to raise the arm at the end of the set down time, a solder feeder mounted on the arm having guide tube means for feeding wire solder to the joint heated by the torches, another resetting timer also started by arrival of the arm at its lowered position settable to control the start of the solder feeding at a selected interval after the start of the timer, means actuated by raising of the arm for interrupting the timers which then reset to zero, indexing means for the work carrier, and means actuated by arrival of the arm at its raised position for activating the indexing means to move the work carrier to bring the next station into soldering position.

5. In a soldering machine, a support, an arm pivoted thereon, a piston for moving the arm between raised and lowered positions, a work carrier having a plurality of stations holding work with joints to be soldered, a pilot valve actuated by arrival of the work carrier at a position in which a joint to be soldered at one station is beneath said arm for activating said piston to lower the arm, torches carried by the arm clear of the work in the raised position of the arm and lowered by the arm to a position directing flame against the joint to be soldered, a resetting timer started by arrival of the arm at its lowered position and settable to determine the down time of the arm for controlling said pilot valve to activate said piston to raise the arm at the end of the set down time, a piston for moving the index means, and a pilot valve controlling the index piston actuated by the arrival of the arm at its raised position for activating the piston to move the index means to bring the next station into soldering position.

References Cited in the file of this patent
UNITED STATES PATENTS

| 2,082,080 | Palucki | June 1, 1937 |
| 2,423,038 | Merwin | June 24, 1947 |